(No Model.)   3 Sheets—Sheet 1.
W. R. TAYLOR.
APPARATUS FOR BURNING CEMENT MAKING MATERIALS AND PROCESS OF OBTAINING CARBON DIOXID.
No. 545,552.   Patented Sept. 3, 1895.
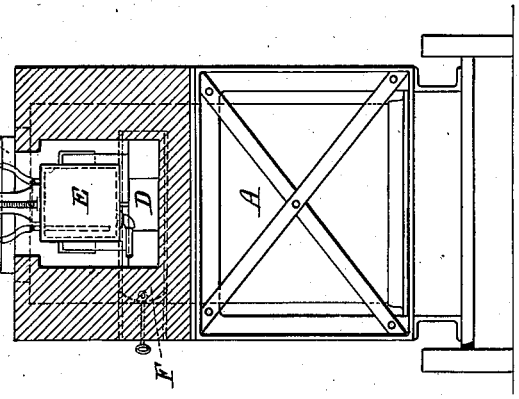
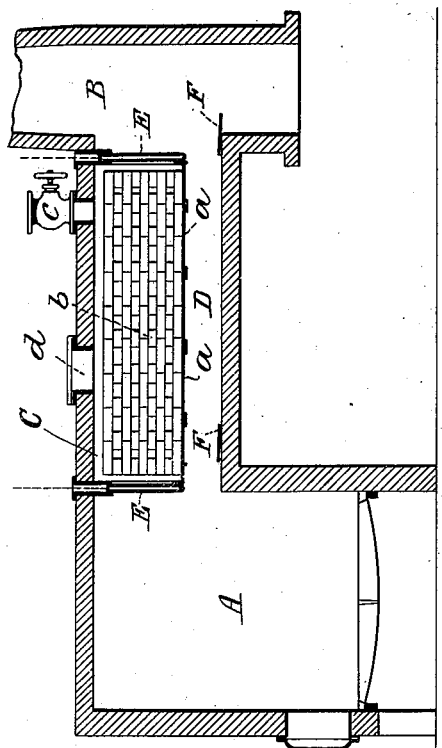
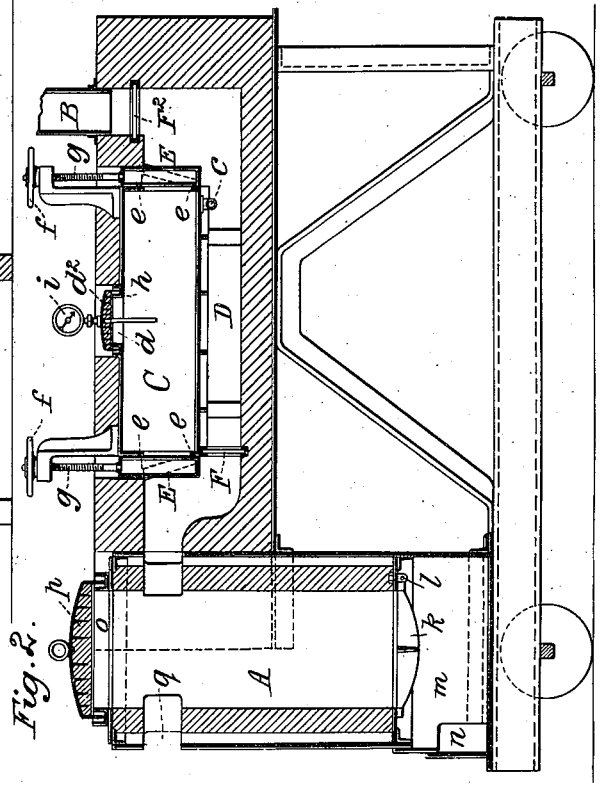
Witnesses
Inventor.
William R Taylor (No Model.) 3 Sheets—Sheet 2.
W. R. TAYLOR.
APPARATUS FOR BURNING CEMENT MAKING MATERIALS AND PROCESS
OF OBTAINING CARBON DIOXID.
No. 545,552. Patented Sept. 3, 1895.
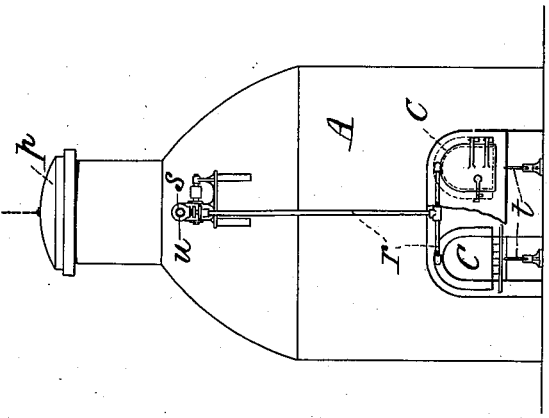
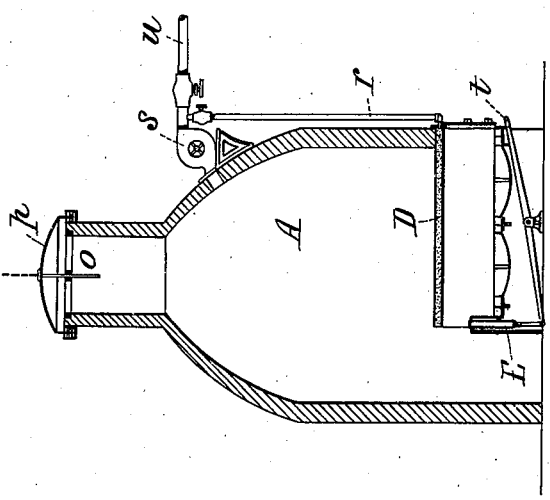
Witnesses
Inventor
William R. Taylor (No Model.) 3 Sheets—Sheet 3.
W. R. TAYLOR.
APPARATUS FOR BURNING CEMENT MAKING MATERIALS AND PROCESS OF OBTAINING CARBON DIOXID.
No. 545,552. Patented Sept. 3, 1895.
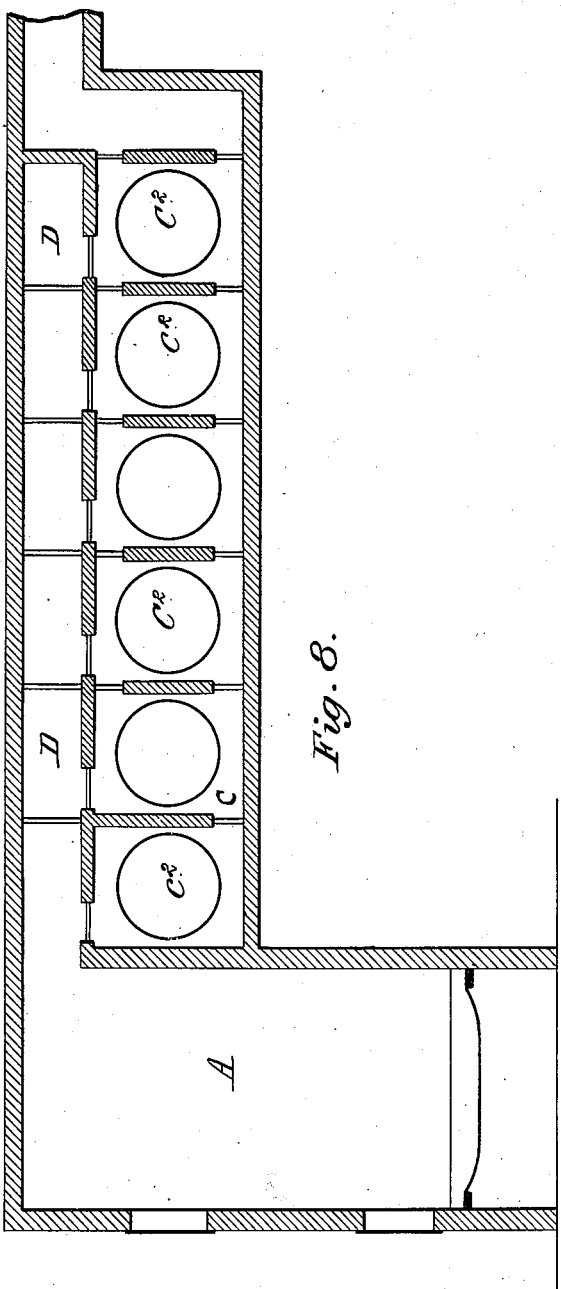

UNITED STATES PATENT OFFICE.

WILLIAM ROWLAND TAYLOR, OF ROCHESTER, ENGLAND.

APPARATUS FOR BURNING CEMENT-MAKING MATERIALS AND PROCESS OF OBTAINING CARBON DIOXID.

SPECIFICATION forming part of Letters Patent No. 545,552, dated September 3, 1895.

Application filed April 5, 1895. Serial No. 544,573. (No model.) Patented in England September 26, 1891, No. 16,375.

*To all whom it may concern:*

Be it known that I, WILLIAM ROWLAND TAYLOR, engineer, a subject of the Queen of Great Britain and Ireland, residing at Medway Works, Rochester, in the county of Kent, England, have invented certain Improvements in and Apparatus for Burning Cement-Making Materials, Lime, Chalk, or the Like, for the Obtainment of Carbonic-Acid Gas in the Process, (patented in Great Britain September 26, 1891, No. 16,375,) of which the following is a specification.

The object of my invention is to so conduct the process of burning cement-making materials, lime, chalk, or the like that the carbonic-acid gas which is given off in the process can be obtained in an economical manner and in a pure or comparatively pure condition.

My invention also includes apparatus for carrying the process into effect.

The process consists in first subjecting the cement-making materials, lime, chalk, or the like to a sufficient temperature to drive off the moisture, organic matter, and the like, the material being for this purpose contained in a chamber which can be opened to allow the vapor and matter driven off to pass to a chimney or outlet from which (if the retort or vessel in which cement-making materials, lime, chalk, or the like are contained is closed) the vapor and matter driven off can be collected for utilization, if desired. The said retort or chamber, if not already closed, is closed as soon as a temperature is attained at which carbonic-acid gas is given off, and the carbonic-acid gas as it is given off is withdrawn from the said chamber through a closable outlet provided for the purpose, a fan being used, if desired, to force or draw out the gas as it is produced. The contents of the chamber are then fused, either in the same chamber or in another chamber. The heat necessary to continue the production of carbonic-acid gas is applied to the outside of the said chamber, the heat escaping from a chamber in which cement-making materials, lime, chalk, or the like, previously treated as described, are being fused, being preferably used for thus heating the chamber from which carbonic-acid gas is being driven off.

The accompanying drawings represent apparatus suitable for carrying out my invention in practice.

Figure 1 is a longitudinal section of a rectangular kiln constructed according to my invention. Figs. 2 and 3 are respectively a longitudinal section and a transverse section of a similar kiln (or it may be a dome-kiln) constructed according to my invention, showing a modification in the construction of the flues and fireplace. Figs. 4 and 5 are respectively a vertical section and a front elevation of a dome-kiln constructed according to my invention. Figs. 6 and 7 show in longitudinal and transverse section an arrangement of rotating chambers suited for matter in small particles, and Fig. 8 shows in longitudinal section chambers or retorts arranged to be fed from outside the flues.

Referring to Fig. 1, A is the fireplace or kiln in which the cement-making materials or the like are burned, which kiln may be of the ordinary construction used for burning clinker for cement-making. B is the chimney, and C D are two flues by which the fireplace or kiln A is connected to the chimney B. These flues are shown as being arranged one above the other, they being separated by plates of iron a, and each flue is povided with dampers marked E and F, respectively, by which the communication between the fireplace or kiln A and the chimney B can be opened and closed as required. In the upper flue C bricks or blocks b of cement-making material or the like are stacked, they being preferably perforated and corrugated to facilitate the drying thereof. In commencing to work the kiln the dampers E of the upper flue C are opened and the flue D is closed by the dampers F. The fire is then started in the fireplace or kiln A, the products of combustion passing therefrom to the chimney B through the flue C and in its passage mingling with the bricks or blocks b, thereby driving therefrom the moisture and other matter contained therein and raising them to a temperature at which carbonic-acid gas is driven off from the said bricks or blocks. When carbonic-acid gas commences to pass off, the dampers E of the flue C are closed and the dampers F of the lower flue D are opened. The products of combustion from the fireplace A then pass through the flue D to the chimney and in their passage impinge upon the floor $a$ and maintain the required heat in the flue C until the whole of the carbonic-acid gas is driven off from the bricks or blocks in the flue C, which carbonic-acid gas passes from the said flue by the cock $c$ and may be conducted by a pipe or passage in connection therewith into any suitable receiver or other desired place. When the whole of the carbonic-acid gas has been driven off, the dampers E are opened and heat from the fireplace or kiln A is allowed to pass through the bricks or blocks $b$ until the kiln is burned out. The bricks or blocks are then removed from the flue C, and may then be fused with fuel in the fireplace or kiln A, a fresh charge of molded green bricks or blocks being stacked in the flue C to be acted on in the manner described. $d$ is an opening in the flue C by which the bricks or blocks may be inserted and removed. During the time carbonic-acid gas is being driven off from the bricks or blocks I preferably employ as fuel in the fireplace A coke in combination with oxygen or other gas or liquids to support combustion. The damper F in the flue D nearest the fireplace is then opened and that at the opposite end of the said flue nearest the chimney closed, so that the heat from the fireplace will enter the flue D and be retained therein, so as to efficiently maintain the heat in the flue C above. The carbonic-acid gas may be drawn from the flue C by means of a fan or exhauster in connection with the outlet $c$.

In the arrangement illustrated by Figs. 2 and 3 the upper flue C consists of a cast-iron retort, open at its two opposite ends and provided with valves or dampers E, for closing the passage through the retort when required, as in the arrangement Fig. 1. These dampers or valves are made hollow to contain air or water, or water is caused to circulate therethrough, to prevent them from becoming twisted by the heat to which they are subjected. Grooves $e$ are provided in the faces of these dampers or valves to contain packing, of asbestos or other suitable material, to form air-tight joints between them and the ends of the retort when in their closed position. These valves or dampers may be opened and closed by means of hand-wheel nuts $f$, fitting screws $g$, connected to the valves, as shown, or by any other suitable means, and there may be inclined surfaces on the valves or dampers and on the parts in which they slide, as shown in dotted lines, so as to cause the said valves or dampers to be forced tightly against the retort ends as they are closed. D is the under flue, having a damper F for closing the passage therethrough when required. The bricks or blocks of cement-making material or the like are placed in the flue or retort C through the manhole $d$, provided with a cover $d^2$, luted when in position by a sand or lead joint $h$ to make it air-tight. $i$ is a pyrometer, to indicate the heat in the flue C. The heated products of combustion from the fireplace or kiln A are, if desired, first caused to pass through the flue or retort C (the dampers E being open and the damper F in the lower flue D being closed) until carbonic-acid gas commences to pass off from the bricks or blocks, whereupon the valves or dampers E are closed and the damper F is opened. The products of combustion then pass through the flue D to the chimney, circulating in their passage over the exterior surface of the upper flue or retort C, so as to maintain the heat thereof at the temperature required to drive off the carbonic-acid gas from the bricks or blocks, a valve or damper $F^2$ being fitted in the chimney B to regulate the heat as required, by governing the passage thereto of the heated products of combustion from the fireplace or kiln A. When the whole of the carbonic-acid gas has been expelled from the bricks or blocks, the valves or dampers E can be opened to allow the products of combustion from the kiln A to pass through the retort C until the kiln is burned out, the whole of the heat left in the kiln after the material therein is fused being passed through the bricks or blocks contained in the flue or retort C. The grate $k$ of the kiln A is hinged at $l$, so that when the fusion of the material is completed this grate may be lowered, so as to discharge the contents of the kiln into the chamber $m$ below, from which it may be removed through the doorway $n$. The bricks or blocks are removed from the flue C and then fed into the kiln A from the top through the opening $o$, which is provided with an air-tight cover $p$, fuel being supplied to the kiln as required through the doorway $q$.

The apparatus may be fixed in position or be mounted on wheels, as shown, to render it capable of being readily transported from place to place.

The foregoing arrangement is suitable for application to existing dome-kilns for converting them into flue-kilns. Figs. 4 and 5 show an arrangement according to my invention applied to a dome-kiln. To the upper part of the kiln A, I fit a hood or cover $p$, and in the fire-place I fit one or more (two being shown in the drawings) saddle-shaped chambers C, closed in front and open at the rear. The space D between the inner and outer walls of each of these saddles is open at the inner end to the interior of the kiln and is filled with loose asbestos, while the opposite inclosed end of the space is connected by a pipe $r$ to a pan $s$, by which carbonic-acid gas may be forced into the space, or superheated steam can be passed through the saddle at a high temperature. Each chamber C is provided at the inner end with a valve or damper E for closing the passage therethrough, when required. The blocks of cement-making material or the like are stacked in the kiln A, and a fire being started in the saddle-shaped chambers C (the valves or dampers E being open) the heated products of combustion therefrom pass into the kiln A and in their passage therethrough to the outlet o at top heat and dry the material under treatment in the kiln. As soon as carbonic-acid gas commences to pass off from the said material, the hood or cover p is lowered, so as to close air-tightly the outlet o, and the valves or dampers E at the inner ends of the chambers C are also closed by depressing the levers t, or otherwise. The fan s is then set in motion, whereby the carbonic-acid gas is drawn from the kiln A and conducted by the pipe u into a suitable receiver, a portion of the said gas being conducted by the pipe r into the spaces D containing the asbestos (or superheated steam at a high temperature may be so passed in) for the purpose of maintaining the heat of the kiln. During the time the carbonic-acid gas is being driven off all air is excluded from the kiln, and coke is preferably employed as fuel in the chambers C, together with oxygen, to promote combustion, in which case the heat of the kiln is maintained without returning a portion of the carbonic-acid gas or superheated steam to the asbestos in the spaces D. When the whole of the carbonic-acid gas is driven from the material under treatment, the hood p is raised from the outlet o and the valves or dampers E are opened, so that the heat from the chambers C pass through the said material in the kiln A until the material is sufficiently burned, after which the burned material is removed from the said kiln.

Figs. 6 and 7 show retorts $C^2$, mounted so as to be capable of rotating in a flue C, situated between a rotary or other fusing-kiln and the chimney B, the flue C in which they are mounted being an alternative passage with the flue D beneath, the passage of the heat from the fusing-kiln through either of these alternative flues being controlled by dampers E F. Superheated steam can be admitted by the pipe r, and the pipe c is for the exit, first, of the moisture and other matter given off, and, subsequently, of the gas, the inlet to the said pipe c being protected by a cap $c^2$ to prevent any material under treatment from entering the said exit for the gas, as this arrangement is intended more especially for treating materials in fine particles. Fig. 8 shows stationary retorts $C^2$ fixed in one of a similar arrangement of alternative flues C D. If the flues be long, the heat from fusing-kilns may be led in at each end, the chimney being in the middle, so as to heat the whole of the retorts as equally as possible. The heat passing from the flues may pass under a drying-floor for the preliminary drying of the materials. Retorts thus arranged can project to outside the flue, so that they can be charged and discharged very readily.

Having now particularly described and ascertained the nature of my said invention and in what manner the same is to be performed, I declare that what I claim is—

1. The process of burning cement-making materials such as specified, and of obtaining carbonic acid gas therefrom, said process consisting in first heating said materials by direct contact with gaseous products of combustion, until the moisture, organic matter and the like are driven off and the temperature is reached at which carbonic acid gas is given off, and subsequently continuing the heating of said materials out of contact with the gaseous products of combustion during the formation of the carbonic-acid gas, substantially as described.

2. In apparatus for burning cement-making materials, such as lime, chalk or the like, the combination with a furnace or fusing kiln, of a chamber retort or kiln constituting in part the exhaust flue of said furnace and through which the products of combustion are adapted to pass, and a valve or valves for closing the flue around the retort while the circulation takes place through the latter and a valve or valves for closing the retort when the circulation takes place around the same, whereby the carbonic acid gas may be withdrawn from the retort after the proper temperature has been reached, substantially as described.

3. In apparatus for burning cement-making materials, such as lime, chalk, or the like, the combination with a furnace or fusing kiln, of a chamber, retort or kiln located in the exhaust flue and through, or around and in contact with which the products of combustion are adapted to pass, and a valve or valves for closing the flue around the retort while the circulation takes place through the same and a valve or valves for closing the retort when the circulation takes place around the same, whereby the carbonic acid gas may be withdrawn from the retort after the proper temperature has been reached, said temperature being maintained by the passage of the products of combustion through the flue in contact with the retort, substantially as described.

In testimony whereof I have signed my name to this specification in the presence of two subscribing witnesses.

WILLIAM ROWLAND TAYLOR.

Witnesses:
HUTCHINSON WILD,
JAMES TONKIN COLEGATE.